United States Patent
Bhattacharjya

(10) Patent No.: US 7,428,331 B2
(45) Date of Patent: Sep. 23, 2008

(54) PAGE BACKGROUND ESTIMATION USING COLOR, TEXTURE AND EDGE FEATURES

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 778 days.

(21) Appl. No.: 11/000,316

(22) Filed: Nov. 30, 2004

(65) Prior Publication Data

US 2006/0115153 A1 Jun. 1, 2006

(51) Int. Cl.
G06K 9/00 (2006.01)
G06K 9/34 (2006.01)
G06K 9/40 (2006.01)
G06K 9/62 (2006.01)

(52) U.S. Cl. .................. 382/165; 382/164; 382/180; 382/225; 382/275

(58) Field of Classification Search ............... 382/164, 382/165, 167, 171, 173, 180, 225, 275; 358/518, 358/523
See application file for complete search history.

(56) References Cited

U.S. PATENT DOCUMENTS

| | | | |
|---|---|---|---|
| 5,093,871 A | 3/1992 | Klein et al. | |
| 6,222,642 B1 | 4/2001 | Farrell et al. | |
| 6,323,957 B1 | 11/2001 | Ball | |
| 6,618,171 B1 | 9/2003 | Tse et al. | |
| 6,621,595 B1 * | 9/2003 | Fan et al. | 358/3.26 |
| 6,718,063 B1 * | 4/2004 | Lennon et al. | 382/224 |
| 6,862,117 B1 * | 3/2005 | Ford et al. | 358/475 |
| 7,251,364 B2 * | 7/2007 | Tomita et al. | 382/180 |
| 7,260,259 B2 * | 8/2007 | Comaniciu et al. | 382/173 |
| 2001/0050778 A1 * | 12/2001 | Fukuda et al. | 358/1.9 |
| 2002/0102017 A1 * | 8/2002 | Kim et al. | 382/164 |
| 2003/0118232 A1 * | 6/2003 | Li et al. | 382/170 |
| 2003/0161007 A1 | 8/2003 | Maurer et al. | |

OTHER PUBLICATIONS

Cheng ("Mean Shift, Mode Seeking, and Clustering," IEEE Transaction on Pattern Analysis and Machine Intelligence, vol. 17, No. 8, Aug. 1995, pp. 790-799).*

Pan et al. ("Robust Color Image Segmentation Based on Mean Shift and Marker-Controlled Watershed Algorithm," IEEE Proc. 2nd Int'l Conf. on Machine Learning and Cybernetics, Xi'an, Nov. 2-5, 2003, pp. 2752-2756).*

* cited by examiner

Primary Examiner—Yubin Hung

(57) ABSTRACT

An algorithm for estimating which pixels belong to the background of a scanned page. The algorithm is particularly designed to handle situations in which the page background varies in color/intensity, as is case when bleed-through artifacts from the reverse side of the page appear in the background. In determining background regions, including properly classifying bleed-through artifacts regions as such, the algorithm uses multiple local and global criteria for making the determination. In addition to being able to find large connected pieces of background, the algorithm is also able to find isolated islands of background by analyzing transition characteristics of neighboring regions. Regions are identified on the basis of similar local features and also by the nature of transitions between foreground regions that do not directly share a boundary. An adaptive white-point adjustment technique based on identified background regions improves the perceived quality of the printed output.

13 Claims, 4 Drawing Sheets

PAGE BACKGROUND ESTIMATION USING COLOR, TEXTURE AND EDGE FEATURES

BACKGROUND OF THE INVENTION

1. Field of the Invention

The present invention relates to an algorithm for determining which pixels correspond to the background of a digitized, e.g., scanned, document. Embodiments of the algorithm may be realized as methods, various aspects/steps of which may be performed by an appropriately configured apparatus (e.g., a copier, printer, computer, etc.). Additionally, a program of instructions (e.g., software) directing such apparatus to perform the methods or steps thereof may be embodied on a medium that is readable by the apparatus.

2. Description of the Related Art

One of the important problems to be addressed in the design of copiers and printers is the determination of which pixels correspond to the background of a scanned page to enable the suppression/modification of those pixels if desired. In simple cases, i.e., when the background color does not vary much, the problem of determining that color (which in these cases is usually the paper color) is straightforward. Simple color histograms may be used to make the determination. However, determination and elimination of background color becomes a much more challenging problem when the background color varies, which can occur, for example, when bleed-through artifacts from the opposite side of the page are present. In the bleed-through situation, the page background does not have a uniform color; instead the bleed-through artifacts can cause significant background variability. Approaches based on simple color histograms are unable to account adequately for such page background variability.

Thus, there is a need to address and solve this shortcoming.

OBJECTS OF THE INVENTION

Accordingly, it is an object of the present invention to provide an algorithm for estimating page background color, even when the page background varies, e.g., as a result of bleed-through artifacts.

It is another object of this invention to provide such an algorithm that uses multiple local and global criteria for making the page background color estimation.

SUMMARY OF THE INVENTION

According to one aspect, this invention provides a method for estimating the background portion of a document. The method comprises obtaining a digital representation of the document, the digital representation comprising a two-dimensional array of elements, the color of each of which is specified by a combination of color component values; delineating clusters of pixels in a multimodal space of selected image features; assigning an initial label to each pixel to identify the closest feature mode in the multimodal feature space, the initial labels defining an initial label set; grouping like-labeled pixels into respective regions based on adjacency and distance in feature space; organizing the regions in a selected format representing region adjacency and spatial location; and refining the organization of the regions in the selected format to obtain a reduced set of labels.

Preferably, the delineating step is performed by applying a recursive mean-shift algorithm to the representation.

Preferably, the selected format is a nodal graph in which each node represents a unique image label and an edge exists between two nodes if the corresponding labels are adjacent in the labeled representation.

Preferably, the refining step comprises processing the nodal graph to (i) merge adjacent nodes if the associated feature modes lie within corresponding thresholds, and/or (ii) determine transition regions in the representation, in which case paths of a specified length starting from nodes that connect to only one other node are preferably examined to construct a set of region-transition rules.

The method may also include the step of performing adaptive white-point adjustment, which may involve mapping each label in the initial label set to one of the labels in the reduced set of labels; projecting the feature modes corresponding to each of the labels in the initial label set that map to a background label in a pixel location subspace to identify a set of pixel locations in the digital representation with associated colors corresponding to the feature modes; using the associated colors as local estimates of white points for the document; and propagating the local estimates to all locations in the document by interpolation.

In another aspect, the invention involves an apparatus, which is preferably a copier, printer or computer. The apparatus comprises one or more components or modules for performing the processing described above.

In accordance with further aspects of the invention, the above-described method or any step thereof may be performed in response to execution of a program of instructions (e.g., software) by a computer, printer/copier, or other processor-controlled device. Alternatively, the program of instructions may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Overview

Figure 1:
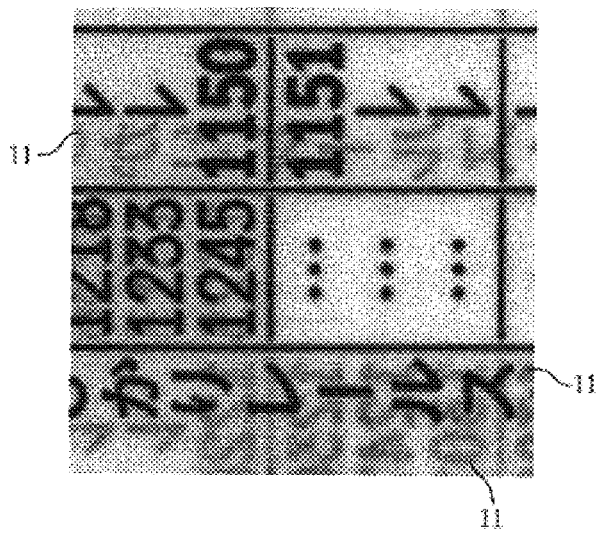
FIG. 1 is a portion of a scanned document illustrating the variability of the background region.

The algorithm/technique of the present invention enables the determination of which pixels belong to the background of a scanned page. The algorithm is particularly designed to handle situations in which the page background does not have a uniform color, as is case when bleed-through artifacts from the reverse side of the page appear in the background. A portion of a scanned document illustrating the variability of the background region is shown in FIG. 1. As can be seen, the bleed-through artifacts 11 vary in intensity between the text/ characters in the foreground and the page background, thus making it difficult to identify the pixels of the artifact regions as belonging to the background. Techniques that rely on simple color histograms do not work well on such documents.

In determining page background regions, including properly classifying bleed-through artifacts regions as such, the algorithm of the present invention uses multiple local and global criteria for making the determination. In addition to being able to find large connected pieces of background, the present invention is also able to find isolated islands of background by analyzing transition characteristics of neighboring regions. Regions are identified on the basis of similar local features and also by the nature of transitions between foreground regions that do not directly share a boundary.

The present invention also provides an adaptive white-point adjustment technique based on identified background regions to improve the perceived quality of the printed output.

Figure 2:
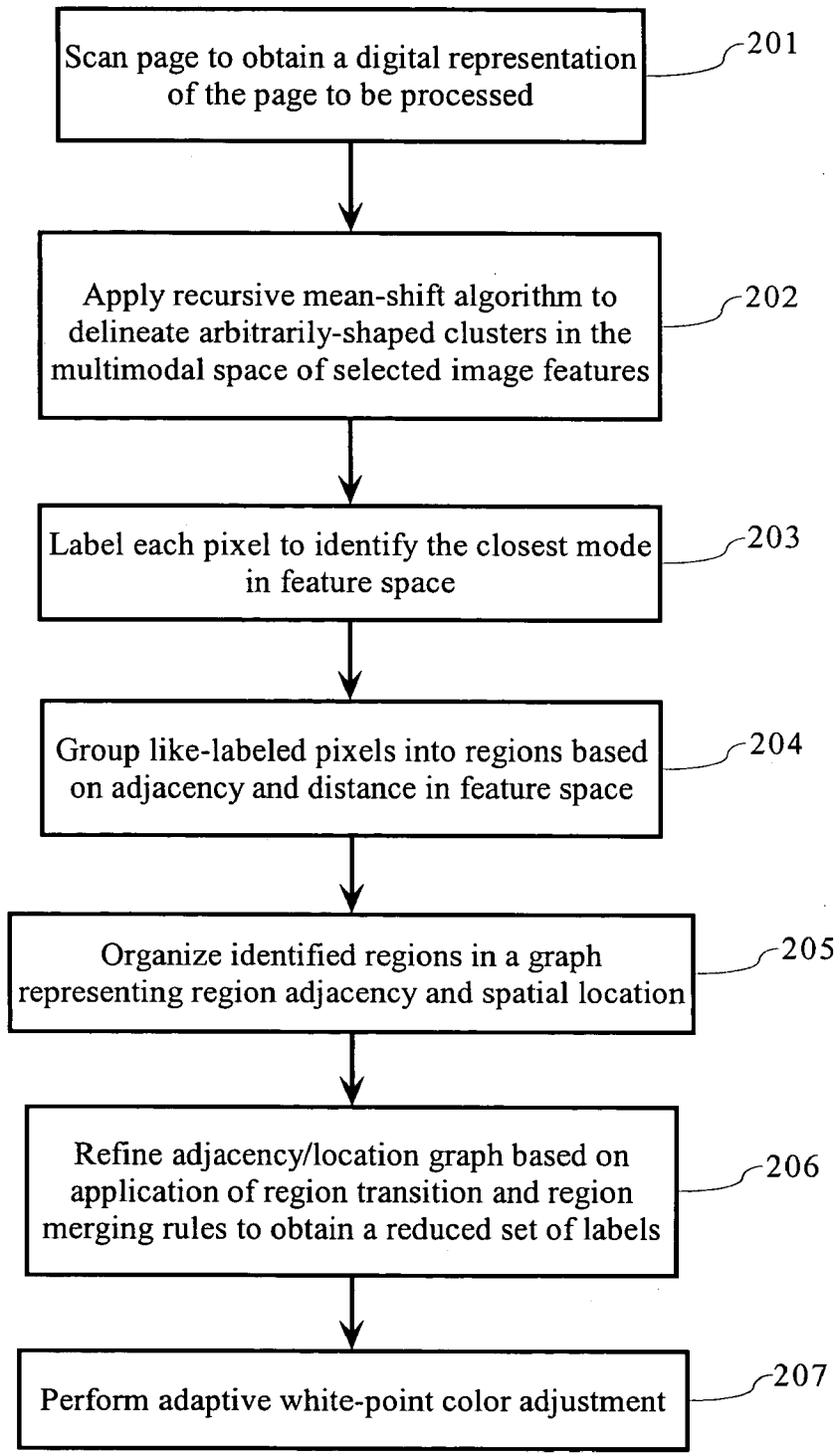
FIG. 2 is a flow chart generally illustrating processing operations of the background estimation algorithm according to embodiments of the invention.

The general processing steps involved in the identification of background regions of a scanned page is illustrated in the flow chart of FIG. 2. Initially, as part of the overall process, a page to be processed is digitized to generate a digital representation thereof that is comprised of a two-dimensional array of color elements (e.g., pixels), the color of each of which is specified by the combination of three color component values (step 201). This can be accomplished, for example, by scanning each page to generate red, green & blue (RGB) pixel data.

Having obtained a digital representation of a page to be processed, a recursive mean-shift algorithm is employed to delineate arbitrarily-shaped clusters in the multimodal space of selected image features (step 202). The pixels are then labeled to identify the closest mode in feature space (step 203). Like-labeled pixels are then grouped into regions based on adjacency and distance in feature space (step 204). After grouping, the identified regions are organized in a graph representing region adjacency and spatial location (step 205). This graph structure is further refined based on the application of region transition and region merging rules to obtain a reduced set of labels (step 206). As a result of this procedure, each label in the original label set is mapped to one of the labels in the reduced set. To perform adaptive white-point color adjustment, local white points over original labels that map to the background label are computed, and smooth interpolation between regions is used to find the white-point correction for each foreground pixel (step 207).

More details regarding each of steps 202-207 explained below.

Foreground (Image) Labeling

Image labeling (steps 202 and 203) involves the identification of image features and determining the modes in their joint distribution. The image features used in this invention are any combination of the following features: pixel location, pixel color, pixel edges, and local texture around each pixel. For background estimation, two components of pixel color are used: pixel lightness and pixel saturation. In one embodiment, the magnitude of the maximum color difference between a given pixel and its 8-connected neighbors is used as the pixel edge feature. Local texture features are computed using two or three non-directional Gabor filter responses around the given pixel. In preferred embodiments, the number of features is restricted to five or six features to limit computational requirements and to have sufficient data points within the high-dimensional space to allow mode determination.

Mode determination is accomplished using a recursive mean-shift procedure to perform gradient descent over the estimated joint distribution of the feature vectors. Given N feature vectors in d-dimensional space, $R^d$, $x_i$, i=1, ..., N, where each pixel gives rise to a feature vector containing the features described above, that is, pixel location, pixel color, pixel edges, and local texture around that pixel, the kernel density estimator is given by:

$$f(x) = \frac{1}{N} \sum_{i=1}^{N} K_H(x - x_i),$$

where $K_H$ is a d-variate kernel. This kernel is realized as a product of radially-symmetric kernels defined over subsets of mutually independent features. The gradient of the density estimator is proportional to:

$$\sum_{i=1}^{N} h(x - x_i) \left\{ \frac{\sum_{k=1}^{N} x_k h(x - x_k)}{\sum_{k=1}^{N} h(x - x_k)} - x \right\},$$

where h( ) is another kernel. The second term in this expression is the mean-shift. The mean-shift vector points in the direction of maximum increase in f(x). Thus, starting from a given pixel (or from feature vector $x_i$), the closest mode can be determined by recursively moving the center of the kernel (initially centered on the subject pixel) along the mean-shift direction until convergence. In the interest of computational speed, all feature vectors that lie within the kernel during the update of a given kernel towards the closest mode are also labeled equivalent to the start pixel.

Figure 3:
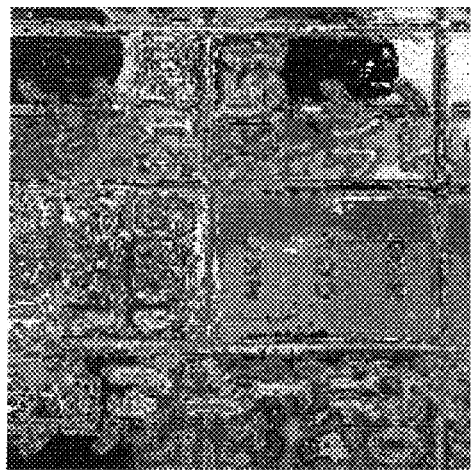
FIG. 3 shows the results of performing initial labeling on the representation shown in FIG. 1.

The result of performing such initial labeling on the image in FIG. 1 is shown in FIG. 3. The labels are represented by different colors or grayscale intensities. The spatial locality of the initial labeling procedure (since pixel location is also a feature) can be seen by examining the tendency of labels to cluster together. The ability of clusters to "jump over" intervening image regions can also be seen.

Region Analysis

Figure 4:
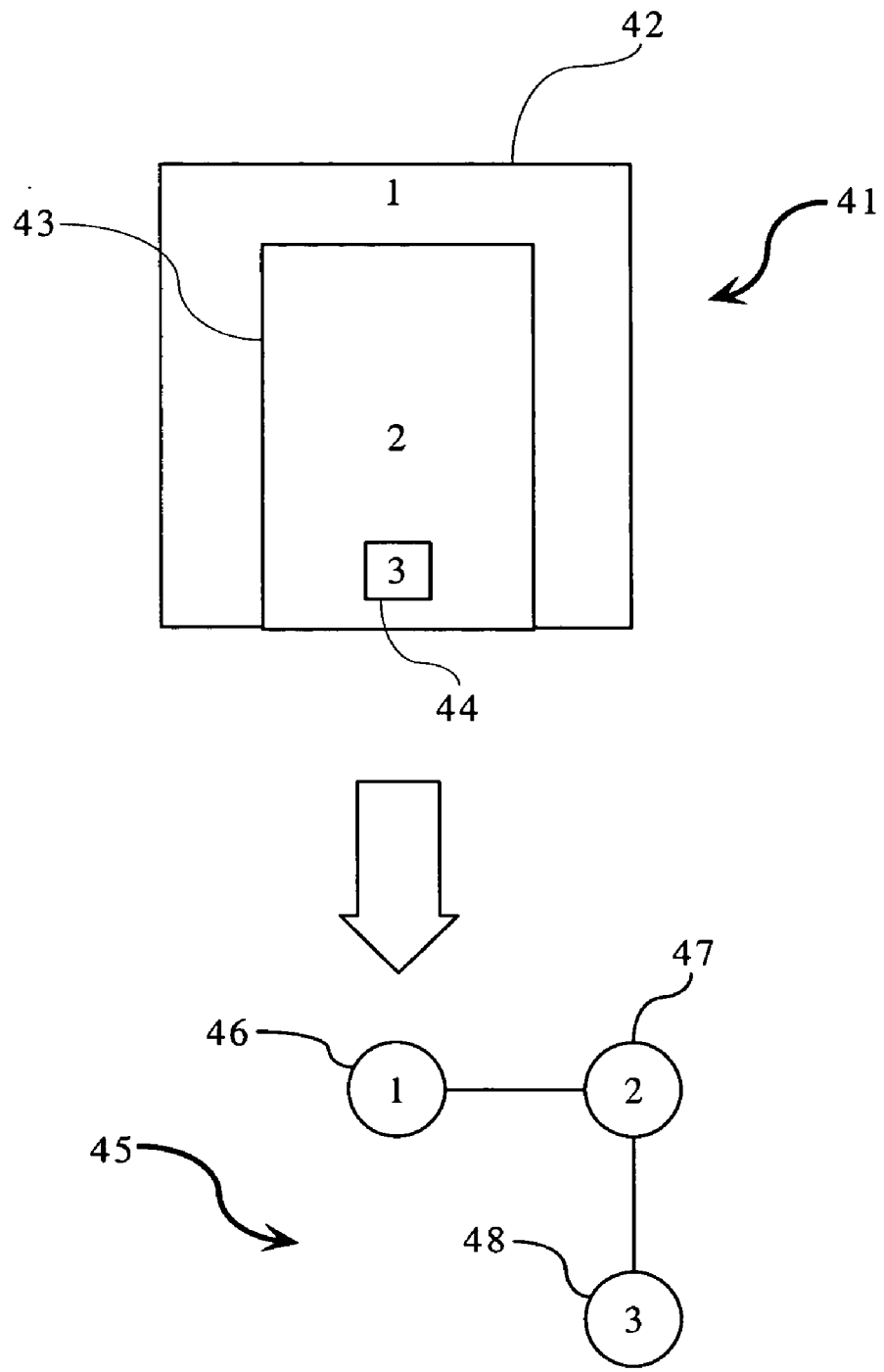
FIG. 4 is a schematic illustration of a portion of a labeled image and a corresponding label adjacency graph.

After performing the labeling described above, the image labels are analyzed to identify different regions in the image (steps 204-206 of FIG. 2). First, a label-adjacency graph is constructed. Each node of this graph represents a unique image label, and an edge exists between two nodes if the corresponding labels are found to be adjacent in the labeled image. Adjacency may be defined in terms of 8-connected or 4-connected neighborhoods. FIG. 4 schematically illustrates a portion of a labeled image 41 and a corresponding label-adjacency graph 45. In this simplified example, there are three labeled regions in the image 42, 43 and 44 (labeled 1, 2 and 3, respectively). In the label-adjacency graph 45, nodes 46, 47 and 48 correspond to labeled regions 42, 43 and 44, respectively. Interconnection between two nodes indicates that the corresponding regions in the image share an edge.

The label-adjacency graph is then processed to merge adjacent nodes if the associated feature modes lie within pre-defined or automatically determined thresholds. Thresholds are determined automatically by first constructing a minimum-spanning tree of the identified feature modes, sorting the determined edge lengths in the tree and using an edge-length histogram to determine the appropriate threshold. After this step, regions with large numbers of pixels and large numbers of edges with other regions are potential background regions.

Next, region transition patterns are determined by looking at paths of lengths 3, starting from nodes which connect to only one other node. Regions that connect to only one other node are surrounded by the region corresponding to the node they are connected to, provided that node is connected to more than one node. This analysis is used to construct a set of region-transition rules. Region transition rules are used to perform further re-labeling of island-type regions. Thus, for example, if an island region (having only one neighboring node) has a length-3 path to a certain popular region type, and the background has a path to this popular region type via the same intermediate region type, the island is also assigned the background region. The region-transition rules keep track of the most popular rules for transition between the most popular sites.

Figure 5:
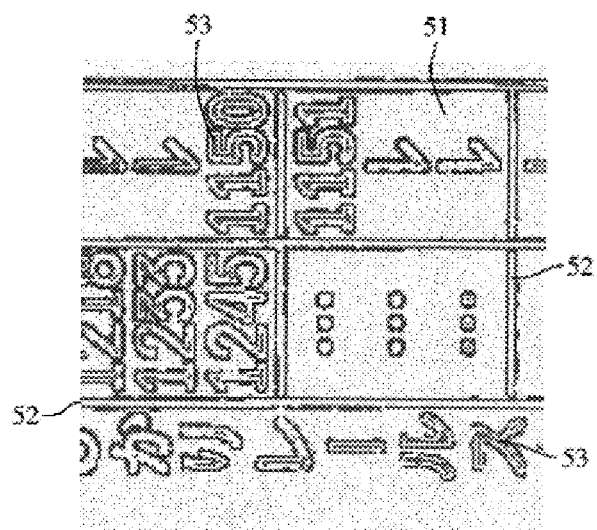
FIG. 5 shows the results of region analysis and re-labeling of the initial labels shown in FIG. 3.

The result of region analysis and re-labeling of the initial labels shown in FIG. 3 is shown in FIG. 5. The labels are represented by different colors/grayscale intensities. The identified background region is designated by the reference numeral 51. Other labeled regions are designated by reference numerals 52 and 53 respectively. Note how transitions (i.e., intervening regions) between differently labeled regions exhibit a consistent pattern.

White Point Adjustment

White-point adjustment is performed by first correlating all initial labels (shown in FIG. 3) with the final labels (shown in FIG. 5). This is a many-to-one mapping. The modes corresponding to each of the initial labels that map to the background label are projected in the pixel location subspace. This identifies a set of pixel locations on the image with associated colors corresponding to the feature modes. These colors are used as the local estimates of white points for the given image. The local estimates are propagated to all locations in the image by interpolation. This is achieved by performing a two-dimensional Delaunay triangulation between the identified pixel locations and using linear or spline interpolation to interpolate values of all pixels within each Delaunay triangle. Other interpolation functions, e.g., radial basis functions, etc., could also be used.

Implementations

Figure 6:
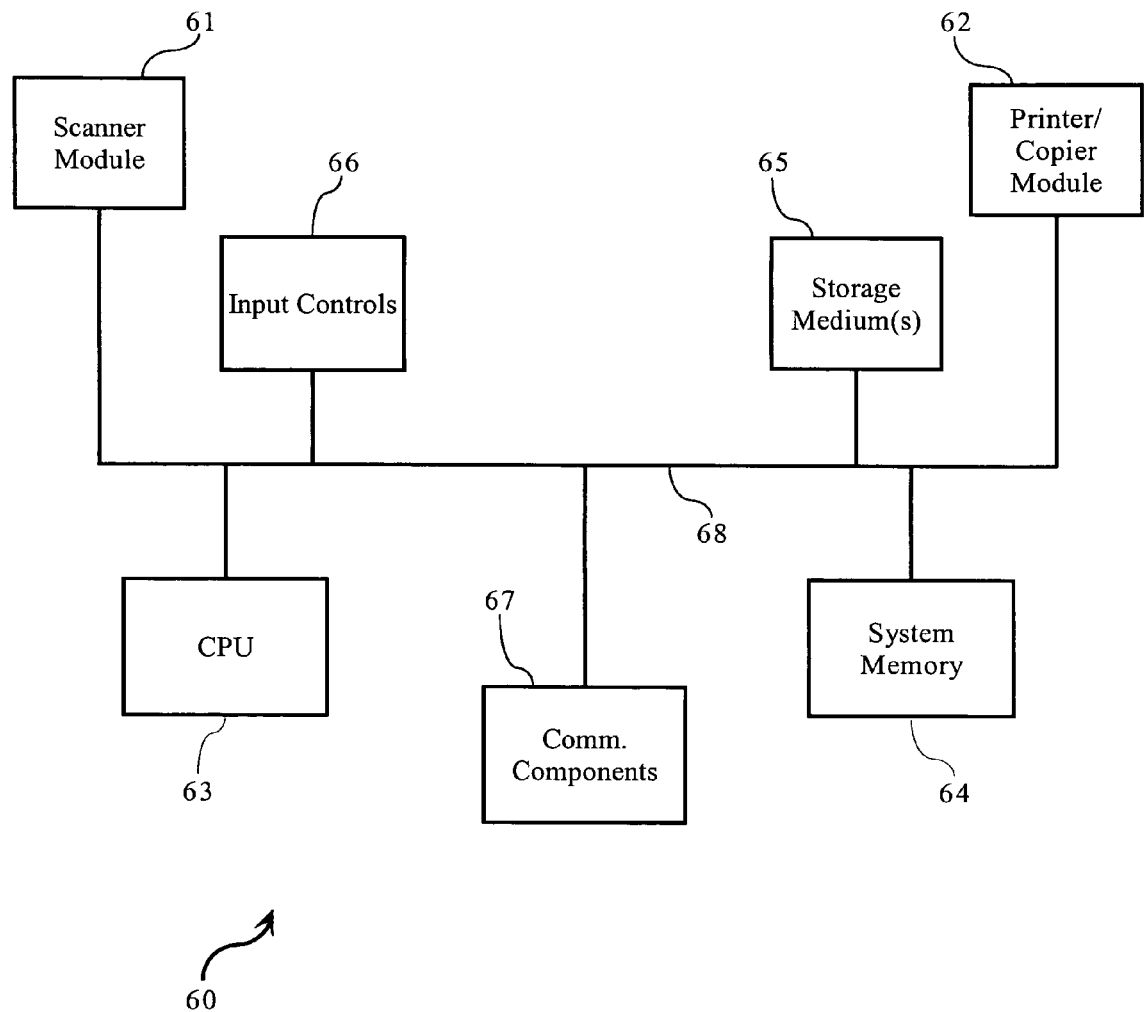
FIG. 6 is a functional block diagram of a system for performing the algorithm.

Having described embodiments of the page background estimation algorithm, the discussion now turns to a system for implementing the algorithm. Referring to FIG. 6, a block diagram of such a system 60 is illustrated. Exemplary system 60 can be configured as a single device (e.g., a device with scanning and printing/copying functions) in which all of the above-described operations are performed.

System 60 comprises a scanner module 61 and a printer/copier module 62. The system further includes a central processing unit (CPU) 63 that provides computing resources for scanner 61 and printer/copier 62 and controls other aspects of the system as well. CPU 63 may be implemented with any suitable microprocessor or the like and may include auxiliary chips to assist with certain functions. System memory 64, which may be in the form of random-access-memory (RAM) and read-only-memory (ROM), is also provided. A storage medium 65 may be used to record programs of instructions for operating systems, utilities and/or applications, which may include embodiments of programs that implement various aspects of the present invention. Storage medium 65 may also be used to store the digital data obtained by scanning the page.

The system 60 will typically also include appropriate input controls 66 which will vary depending on the environment in which the invention is employed and the components used. In the integrated scanner/printer/copier device which system 60 depicts, the input controls may be in the form of a keypad.

System 60 can also include external communication components 67 that can communicate with external devices to send and receive information (i.e., programs and data) including data to be printed/copied in accordance with this invention. To this end, external communication components 67 typically include components to connect to remote devices through any of a variety of networks (wired or wireless) including the Internet, a local or wide area network, or through any suitable electromagnetic carrier signals including infrared signals. Finally, it should be noted that each such module or component in FIG. 6 includes a controller for interfacing with other major system components which are connected through a bus 68 which may represent more than one physical bus.

It should be noted that, while all of the components or modules required for performing the processing of the invention can be integrated into a single device, that is by no means the only arrangement. For example, the scanning function 61 may be performed in a separate device (e.g., a scanner) that is communication with a printer/copier in which the other functions are performed. A personal computer with a scanner and printer/copier as peripherals is yet another environment in which the invention may be embodied. Still other arrangements are possible, as one skilled in the art will recognize.

As will be appreciated from the foregoing, the present invention provides an algorithm for estimating page background color using multiple local and global criteria, even when the page background varies, e.g., as a result of bleed-through artifacts. The algorithm may be embodied in a variety of different environments, as explained above. Within any of those environments, the algorithm may be implemented as software that controls the functions of the various components/modules involved in the processing. The equivalent of software-based instructions may also be realized, for example, using ASIC(s), digital signal processing circuitry, or the like. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. Also, the "one or more components or modules" referred to in the claims covers any appropriately software or hardware that is capable of performing the functions recited. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for estimating the background portion of a document, comprising the steps of:

obtaining a digital representation of the document, the digital representation comprising a two-dimensional array of elements, the color of each of which is specified by a combination of color component values;

delineating clusters of pixels in a multimodal space of selected image features;

assigning an initial label to each pixel to identify the closest feature mode in the multimodal feature space, the initial labels defining an initial label set;

grouping like-labeled pixels into respective regions based on adjacency and distance in feature space;

organizing the regions in a selected format representing region adjacency and spatial location, wherein the selected format is a nodal graph in which each node represents a unique image label and an edge exists between two nodes if the corresponding labels are adjacent in the labeled representation; and refining the organization of the regions in the selected format to obtain a reduced set of labels by processing the nodal graph to determine transition regions in the representation by examining paths of a specified length starting from nodes that connect to only one other node to construct a set of region-transition rules.

2. A method as recited in claim 1, wherein the delineating step is performed by applying a recursive mean-shift algorithm to the representation.

3. A method as recited in claim 1, wherein the refining step comprises processing the nodal graph to merge adjacent nodes if the associated feature modes lie within corresponding thresholds.

4. A method as recited in claim 1, further comprising the step of performing adaptive white-point adjustment.

5. A method as recited in claim 4, wherein the performing step comprises:

mapping each label in the initial label set to one of the labels in the reduced set of labels;

projecting the feature modes corresponding to each of the labels in the initial label set that map to a background label in a pixel location subspace to identify a set of pixel locations in the digital representation with associated colors corresponding to the feature modes;

using the associated colors as local estimates of white points for the document; and propagating the local estimates to all locations in the document by interpolation.

6. An apparatus comprising a scanner, a processor and a memory module configured to perform the method recited in claim 1.

7. A hardware device-readable medium carrying a program of instructions for directing a processor to perform the method recited in claim 1.

8. A method for estimating the background portion of a document, comprising the steps of:

obtaining a digital representation of the document, the digital representation comprising a two-dimensional array of elements, the color of each of which is specified by a combination of color component values;

delineating clusters of pixels in a multimodal space of selected image features;

assigning an initial label to each pixel to identify the closest feature mode in the multimodal feature space, the initial labels defining an initial label set;

performing adaptive white-point adjustment comprising:

mapping each label in the initial label set to one of the labels in the reduced set of labels;

projecting the feature modes corresponding to each of the labels in the initial label set that map to a background label in a pixel location subspace to identify a set of pixel locations in the digital representation with associated colors corresponding to the feature modes;

using the associated colors as local estimates of white points for the document; and propagating the local estimates to all locations in the document by interpolation;

grouping like-labeled pixels into respective regions based on adjacency and distance in feature space;

organizing the regions in a selected format representing region adjacency and spatial location; and refining the organization of the regions in the selected format to obtain a reduced set of labels.

9. An apparatus comprising a scanner, a processor and a memory module configured to perform the method recited in claim 8.

10. A hardware device-readable medium carrying a program of instructions for directing a processor to perform the method recited in claim 8.

11. A method for estimating the background portion of a document, comprising the steps of:

obtaining a digital representation of the document, the digital representation comprising a two-dimensional array of elements, the color of each of which is specified by a combination of color component values;

delineating clusters of pixels in a multimodal space of selected image features;

assigning an initial label to each pixel to identify the closest feature mode in the multimodal feature space, the initial labels defining an initial label set; and performing adaptive white-point adjustment comprising:

mapping each label in the initial label set to one of the labels in the reduced set of labels;

projecting the feature modes corresponding to each of the labels in the initial label set that map to a background label in a pixel location subspace to identify a set of pixel locations in the digital representation with associated colors corresponding to the feature modes;

using the associated colors as local estimates of white points for the document; and propagating the local estimates to all locations in the document by interpolation.

12. An apparatus comprising a scanner, a processor and a memory module configured to perform the method recited in claim 11.

13. A hardware device-readable medium carrying a program of instructions for directing a processor to perform the method recited in claim 11.

* * * * *